US011042366B2

(12) United States Patent
Gibbs et al.

(10) Patent No.: US 11,042,366 B2
(45) Date of Patent: Jun. 22, 2021

(54) MANAGING SOFTWARE PROGRAMS

(71) Applicant: International Business Machines Corporation, Armonk, NY (US)

(72) Inventors: Nathaniel J. Gibbs, Iowa City, IA (US); Matthew Mitchell Lobbes, Northlake, TX (US); Brian James Snitzer, Lancaster, PA (US); Michael Treadway, Keller, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/411,250

(22) Filed: May 14, 2019

(65) Prior Publication Data

US 2020/0364039 A1   Nov. 19, 2020

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC ........... G06F 8/65–658; G06F 8/70–71; G06F 8/60–77
See application file for complete search history.

(56) References Cited

U.S. PATENT DOCUMENTS

| 5,619,698 | A  | * | 4/1997  | Lillich  | G06F 8/65 |
|           |    |   |         |          | 717/168   |
| 8,850,420 | B2 |   | 9/2014  | Yousouf  |           |
| 8,863,114 | B2 |   | 10/2014 | Shah     |           |
| 9,436,585 | B1 |   | 9/2016  | Bak      |           |
| 9,459,856 | B2 |   | 10/2016 | Curzi    |           |
| 9,594,548 | B2 |   | 3/2017  | Pena     |           |
| 10,261,782 | B2 | * | 4/2019  | Suarez  | G06F 8/71 |
| 10,303,499 | B2 | * | 5/2019  | Jobi    | G06F 9/455 |
| 10,324,708 | B2 | * | 6/2019  | Griffin | G06F 8/71 |
| 10,503,448 | B1 | * | 12/2019 | Chhabra | G06F 16/951 |
| 10,719,603 | B2 | * | 7/2020  | Georgiev | G06F 8/71 |
| 2016/0216948 | A1 |  | 7/2016 | McPherson |        |

(Continued)

FOREIGN PATENT DOCUMENTS

| CN | 107943485 A | 4/2018 |
| CN | 108154035 A | 6/2018 |

OTHER PUBLICATIONS

Bruno, Eric, "Security Considerations when using CaaS Providers", Twistlock, Jul. 31, 2017, 9 pages, <https://www.twistlock.com/2017/07/31/security-considerations-using-containers-service-providers/>.

(Continued)

*Primary Examiner* — Ziaul A Chowdhury
*Assistant Examiner* — Zheng Wei
(74) *Attorney, Agent, or Firm* — David K. Mattheis; William H. Hartwell; Nicholas L. Cadmus

(57) ABSTRACT

Managing container applications by providing a registry of managed container base images, each managed container base image wrapped to include an injection point, determining that a managed container base image includes a vulnerability, and creating a patch script to address the vulnerability. Managing container applications further includes inserting the patch script at the injection point and issuing a pull command for an application using the managed container base image, to a container orchestration tool.

17 Claims, 6 Drawing Sheets

(56) References Cited

U.S. PATENT DOCUMENTS

| | | | |
|---|---|---|---|
| 2017/0206123 A1 | 7/2017 | Kirkpatrick | |
| 2017/0344289 A1* | 11/2017 | Jeong | G06F 21/64 |
| 2018/0088926 A1 | 3/2018 | Abrams | |
| 2019/0230130 A1* | 7/2019 | Beckman | G06F 8/65 |

OTHER PUBLICATIONS

He et al., "Elastic Application Container: A Lightweight Approach for Cloud Resource Provisioning", 2012 26th IEEE International Conference on Advanced Information Networking and Applications, pp. 15-22, DOI 10.1109/AINA.2012.74, © 2012 IEEE.

Lasker, Steve, "OS & Framework Patching with Docker Containers—a paradigm shift", Dec. 20, 2017, 5 pages, <https://blogs.msdn.microsoft.com/stevelasker/2017/12/20/os-framework-patching-with-docker-containers-paradigm-shift/>.

Mell et al., "The NIST Definition of Cloud Computing", Recommendations of the National Institute of Standards and Technology, Special Publication 800-145, Sep. 2011, 7 pages.

Microsoft,"Azure Kubernetes Service (AKS)", retrieved from the Internet on Mar. 20, 2019, 16 pages, <https://azure.microsoft.com/en-us/services/kubernetes-service/>.

Nathan, et al., "CoMICon: A Co-Operative Management System for Docker Container Images", 2017 IEEE International Conference on Cloud Engineering, pp. 116-126, DOI 10.1109/IC2E.2017.24, © 2017 IEEE.

Platform9, "CaaS Container as a Service: Managed Kubernetes for Docker", 14 pages, retrieved from the Internet Mar. 20, 2019, <https://platform9.com/blog/containers-as-a-service-kubernetes-docker/>.

PRNewswire, "$4.98 Bn Application Container Market, 2023 by Service, Platform, Application Area, Deployment Mode, Organization Size, Vertical, & Region", Dublin, May 29, 2018, 7 pages, <https://www.prnewswire.com/news-releases/4-98-bn-application-container-market-2023-by-service-platform-application-area-deployment-mode-organization-size-vertical-region-300655724.html>.

Qualys, "Container Security", retrieved from the Internet on Mar. 20, 2019, 17 pages, <https://www.qualys.com/apps/container-security/>.

"Managing Software Programs", PCT Application No. IB2020/054316, filed on May 7, 2020, 23 pages.

International Searching Authority, Patent Cooperation Treaty (PCT), Notification of Transmittal of the International Search Report and the Written Opinion of the International Searching Authority, or the Declaration, International Application No. PCT/182020/054316, dated Aug. 17, 2020 (dated Aug. 17, 2020), 9 pages.

\* cited by examiner

MANAGING SOFTWARE PROGRAMS

BACKGROUND

The disclosure relates generally to managing software updates. The disclosure relates particularly to providing updates for software operating in a cloud-based container.

Cloud-based application containers offer users a computing option requiring fewer resources than a virtual machine. Containers allow the user to run software using access to a subset of a host machine's resources. A user/client may provision a container for use with a base image of an operating system obtained from a service provider.

SUMMARY

Aspects of the invention disclose methods, systems and computer readable media associated with managing container applications by providing a registry of managed container base images, each managed container base image wrapped to include an injection point, determining that a managed container base image includes a vulnerability, and creating a patch script to address the vulnerability. Managing container applications further includes inserting the patch script at the injection point and issuing a pull command for an application using the managed container base image, to a container orchestration tool.

DETAILED DESCRIPTION

Figure 1:
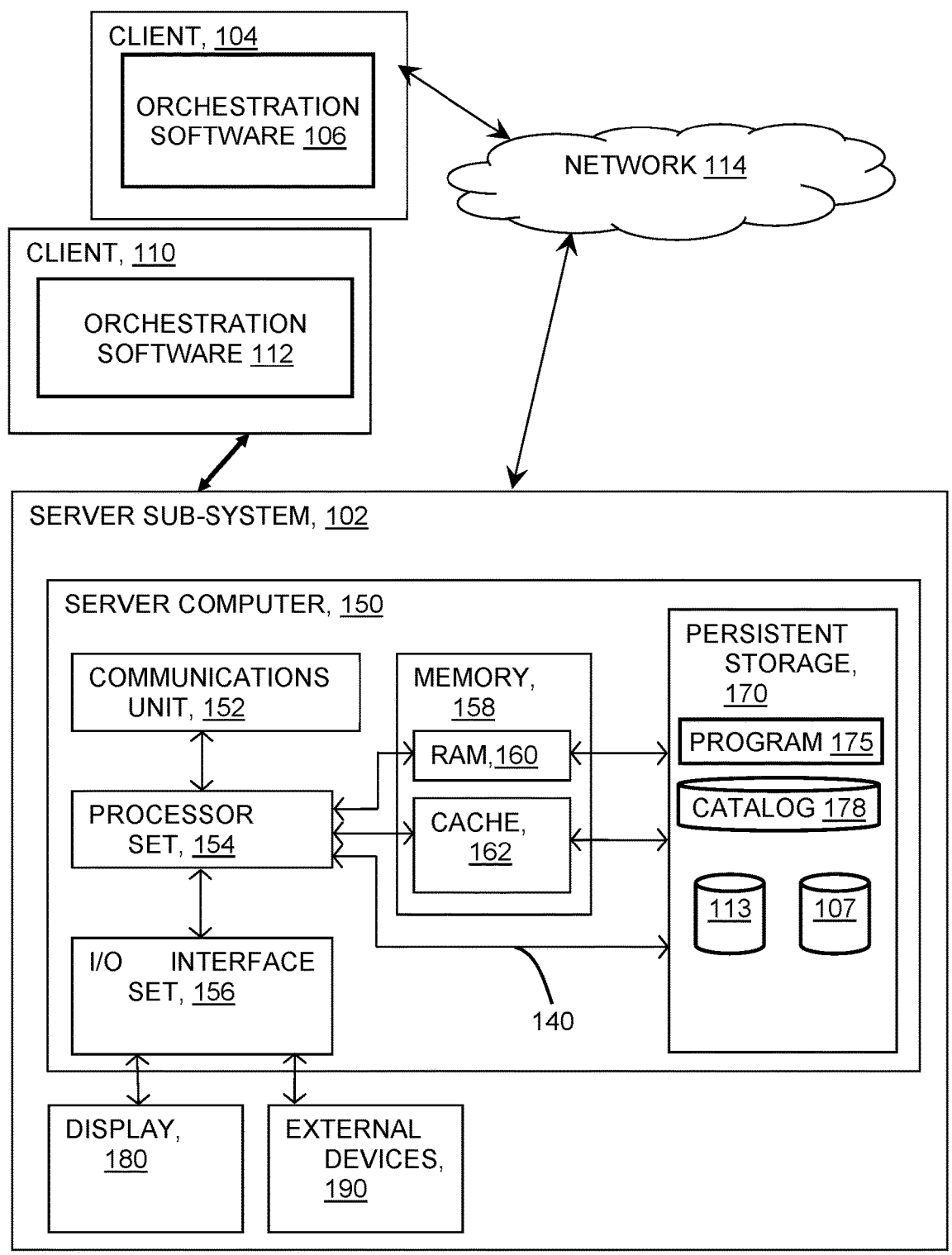
FIG. 1 provides a schematic illustration of a system, according to an embodiment of the invention.

Provisioning an application container with a base image from a service provider provides a user a pre-installed, pre-structured set of content. Patching and updating the container system are the responsibility of the user not the service provider. As container storage is ephemeral, changes made to the image and application are lost when the container stops running, or restarts. Changes must be made to the underlying provisioning image to be effective.

In an embodiment, a cloud resource provider (CSP) receives a request for a container base image from a user. The request can be for a managed image or simply a request for a specific container image. The request can be that a specific container image (i.e., a DOCKER image) be managed and made available through a private image registry. The CSP acquires the base image from either a public image registry or a known private image registry. The CSP then creates a managed version of the requested image file and points the user to the managed version of the file in the private registry. Subsequent requests for the base image having a managed version are answered by pointing the user directly to the managed version of the image in the private registry.

The base image comprises a series of layers created during a build process. The process captures changes to the system's file system associated with the execution of commands in a file defining the environment of the container. All changes associated with each command executed from the file is captured as a layer of the final base image.

The system passes the base image to an image analyzer which identifies and catalogs the image layers. The image analyzer reviews the container base image layer chain and identifies the root layer operating system (OS). The system creates an exact copy of the base image, appended with an injection point according to the root layer OS coding. The new, managed version of the base image is then stored in a private registry with a name indicating that it is a managed version of a base image. The location, or tag, of the managed version is provided to the user to point them to the managed image. The appended injection point enables the system to update, patch or otherwise modify the underlying base image within the new managed version of the base image.

The user then provisions one or more containers using the managed image and a container orchestration software tool, e.g., KUBERNETES. The user may modify/enhance the managed image, adding their custom configurations to the image according to their needs and application requirements.

In an embodiment, the system determines that an OS or application related coding vulnerability affects at least a portion of the managed images stored in the private registry/catalog. The vulnerability may be recognized due to updates published by OS and application publishers. The system creates OS and/or application specific, patch scripts to address the vulnerability. The system of the method passes each affected image from the private registry/catalog to a patch insertion component of the system. The patch insertion component injects the lines of the created patch script into the images at the injection point.

The patched managed image is then published to the private registry in place of the previous version of the managed image. The patched image has the same location, (tag) as the original managed image. After publication, either a manual or automatic application restart command is issued for all affected application containers. The application restarts pull the updated managed image from the private registry and the application begins execution using the updated image. The container image is rebuilt with the patch upon restart.

In an embodiment, a cloud services provider (CSP) identifies a container image. The CSP can receive a request from a user for a specific container image, or the user can provide the image. The request can be for a managed image or simply a request for a specific container image. The CSP acquires the base image from either a public image registry, from the user, or a known private image registry. The CSP then creates a managed version of the requested image file, stores the managed version in the registry, and points the user to the managed version of the file in the private registry. Subsequent requests for the base image are answered by pointing the user directly to the managed version of the image in the private registry. In this embodiment, the CSP alters the base image by wrapping the base image through adding an injection point and a call to a centralized component. That component, when called during the instantiation of a container will poll to determine if there is a managed image that matches the image being restarted. If there is, the updated managed image is returned and the image is rebuilt with the update.

In an embodiment, users make specific image request from a service with knowledge that the service provides managed images. In this embodiment, the user's image request is fulfilled without an indication that the provided image is a managed image.

In an embodiment, the user can specify update preferences to maintain control over individual component software versions used to build the base image. In this embodiment, the user can set limits relating to acceptable and unacceptable update versions using semantic versioning preferences. (For example, the user can provide than any update version 7.* is acceptable, but no update version 8.* is acceptable.)

In an embodiment, the user can specify segments of the base image for which updates are acceptable and segments for which updates are not acceptable. As vulnerabilities and updates are addressed, appropriately segmented patches are passed to the patch insertion component and each user's images are rebuilt according to the user's preferences regarding updates. In an embodiment, the user sets a preference for automatic updates or manual updates. Images with automatic updates are rebuilt and restart commands are pushed to the user's system automatically. Images with manual updates are patched and sent to the user with a notice of the update and instructions allowing the user to accept or reject the patched image.

In an embodiment, the user can provide application level information for their requested image. In an embodiment, the service can provide update and patches for the application and/or its dependencies of the image as well as the underlying operating system of the image. In this embodiment, the system can provide a managed image with an injection point to insert updates and patches, or the service provider can provide a managed image having system polling instructions for periodically checking for updates and patches.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise container orchestration programs 106, 112, together with sufficient computing resource (processor, memory, network communications hardware) to execute the programs. As shown in FIG. 1, server sub-system 102 comprises a server computer 150. Server computer 150 stores the catalog/registry of managed container images. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, cache 162, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., container image management program 175, are stored in persistent storage 170 for execution and/or access by one or more of the respective processor(s) 154 of server computer 150 via cache 162. Persistent storage 170 also contains the catalog of managed images 178 used by the disclosed invention, and application containers 107 and 113, for devices 104 and 110. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., container image management program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
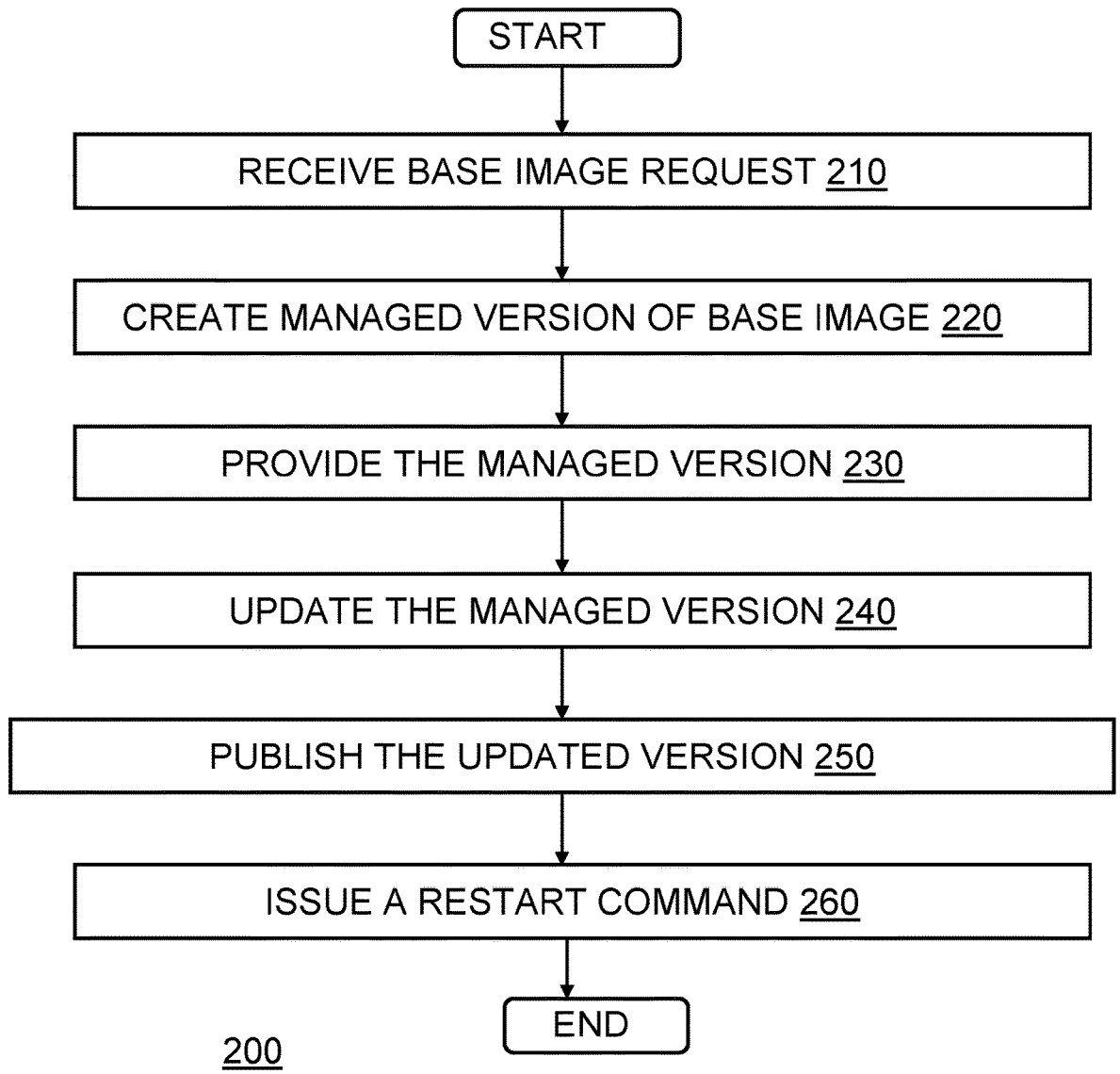
FIG. 2 provides a flowchart depicting an operational sequence, according to an embodiment of the invention.

FIG. 2 provides a flowchart 200, illustrating exemplary activities associated with the practice of the disclosure. After program start, the system receives a request for a container base image from a user at 210. In an embodiment, the request can be received by system image management software residing on a cloud bas3ed server. For requested images having an existing managed version, the system points the user to the location of the associated managed version of the base image in a private image registry (not shown). The user can provide a base image currently in use rather than requesting a new image. The system creates a managed version of the base image at 220, by analyzing the base image layers and adding an injection point to the base image. The system publishes the created managed version of the base image to a private image registry and provides the location of the managed version of the base image to the user at 230. As needed, the system updates, or patches, the managed image version at 240, by inserting appropriate code at the injection point creating a new version of the managed image. The system publishes the new managed image version to the private registry location of the previous version at 250. At 260, the system issues a restart command for all affected container applications. As the restart command is executed, the patched version of the managed image is pulled down from the private image registry. Restarting the application executes the code of the patch, rebuilding the image without the vulnerability, providing the user with the benefit of the update/patch.

In an embodiment, the system maintains a catalog of managed container base images. Each managed image is wrapped to include a code insertion point. Multiple versions of a single base image may be stored in the catalog/registry. Each of the multiple versions can include a unique set of patches to address one or more vulnerabilities of the underlying base image. Each of the multitude may include differing update levels for the layers of the underlying base image. In this embodiment, a user can request a base image including layer update settings acceptable to the user. The user can be provided a managed image including only those updates which are acceptable. The user can choose to manually accept future image updates as they become available. In this embodiment, the managed image is provided to the user with code allowing the user to accept or reject future updates/patches. In an embodiment, the managed images include code which periodically polls the catalog for update notices. In this embodiment, pull or restart instructions are not issued to the user for new patches/updates to the managed image.

Figure 3:
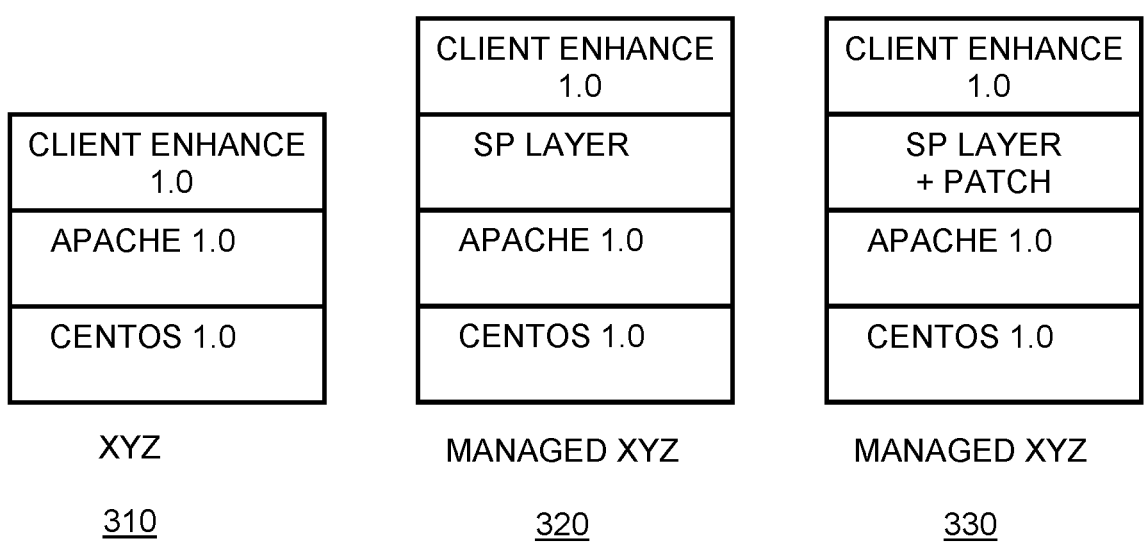
FIG. 3 provides a schematic depiction of image progression, according to an embodiment of the invention.

FIG. 3 illustrates an embodiment of the invention. As shown in the figure, a client image XYZ, 310, including the layers: CENTOS 1.0, APACHE 1.0, and Client Enhance 1.0 is provided. According to the embodiment, a managed version of XYZ, managed.XYZ, 320, including an injection point, the SP layer, is created and made available to the Client. After the system recognizes a need for an update, patching code is inserted at the SP layer and the image is rebuilt yielding a new version of managed.XYZ, 330. (Note: the term(s) "CENTOS", "APACHE", "KUBERNETES" and "DOCKER" may be subject to trademark rights in various jurisdictions throughout the world and are used here only in reference to the products or services properly denominated by the marks to the extent that such trademark rights may exist.)

Figure 4:
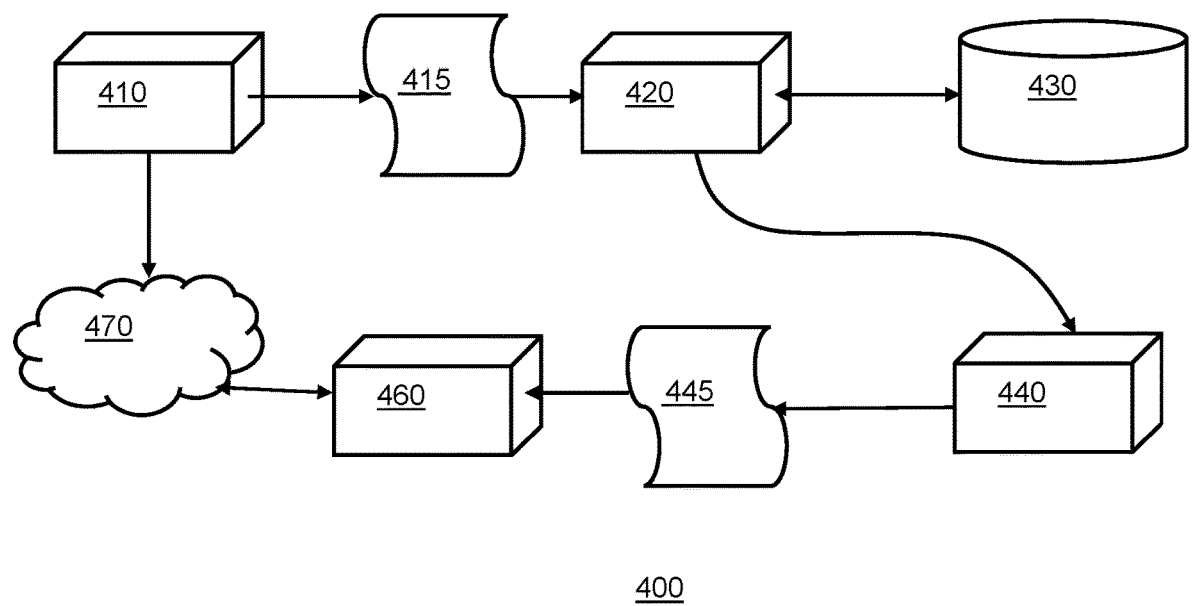
FIG. 4 provides a graphic illustration of operational activities, according to an embodiment of the invention.

FIG. 4 provides a graphical illustration of system architecture 400 and data flow, according to an embodiment of the invention. As shown in the figure, the system 410 determines that a vulnerability exists and generates a patch 415 to address the vulnerability. Patch analyzer 420, receives the patch and reviews the catalog of managed images 430, retrieving managed images which need the patch. Patch insertion element 440, receives the patch and the relevant images from patch analyzer 430, and inserts the patch into the managed images at the insertion point, yielding an updated image 445. The system sends patched managed image 445 to private registry 460 for access by users. User container orchestration element 470, receives image restart instructions from system 410 and pulls the patched image from private registry 460, and rebuilds the image, executing the patch code.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
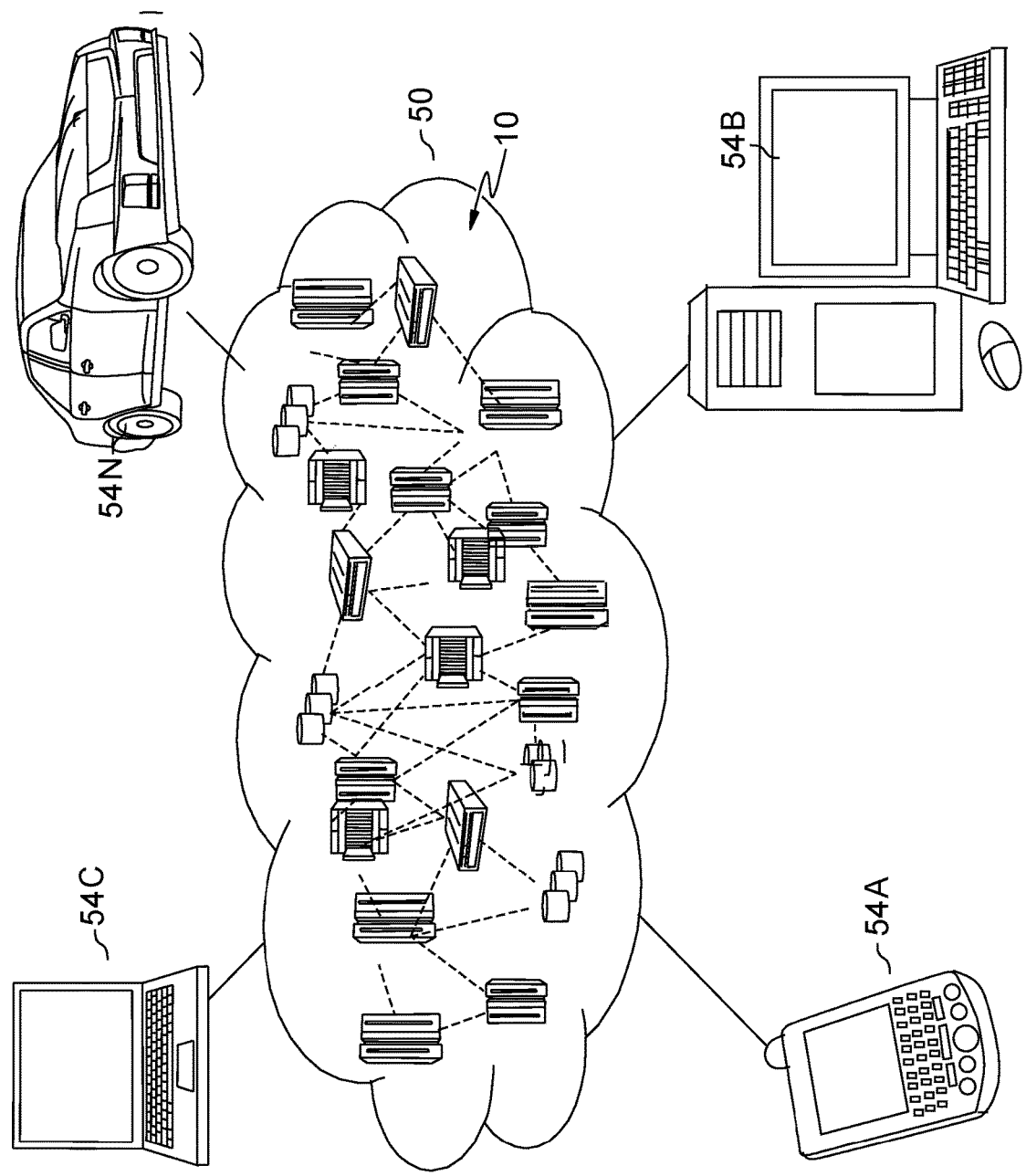
FIG. 5 depicts a cloud computing environment, according to an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
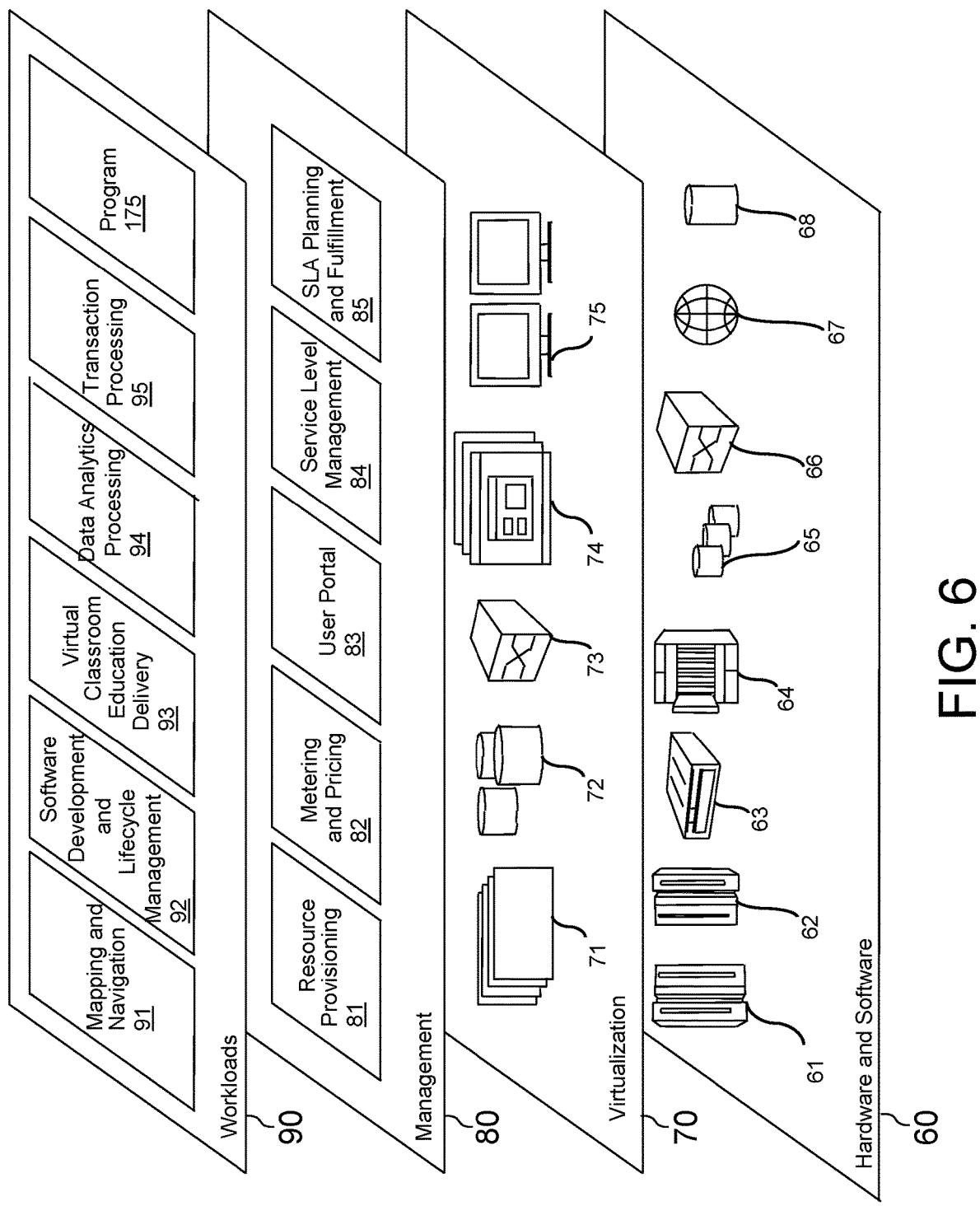
FIG. 6 depicts abstraction model layers, according to an embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container image management program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for managing container applications, the method comprising:
   providing, by a services provider, a registry of managed container base images, each managed container base image of the managed container base images comprising an original container base image;
   identifying image layers in a layer chain for each original container base image in the managed container based images;

identifying a root layer operating system in the identified image layers for each original container base image in the managed container based images;

appending an injection point to each original container base image in the managed container based images according to coding of the root layer operating system;

determining, by the services provider, that a first managed container base image from the registry of managed container base images includes a first vulnerability;

creating, by the services provider, a first patch script to address the first vulnerability;

inserting, by the services provider, the first patch script at the injection point of the determined first managed container base image to create a patched first managed container based image;

determining, by the services provider, that a second managed container base image from the registry of managed container base images includes a second vulnerability;

creating, by the services provider, a second patch script to address the second vulnerability;

inserting, by the services provider, the second patch script at the injection point of the second managed container base image, resulting in a patched second managed container base image;

issuing, by the services provider, a restart command for an application using the determined first managed container base image to a container orchestration tool to pull the patched first managed container based image and rebuild the determined first managed container base image by executing the first patch script; and publishing, by the services provider, the patched second managed container base image.

2. The computer implemented method according to claim 1, further comprising:
receiving, by the services provider, a request for a third container base image;
determining, by the services provider, that the third container base image is not managed; and
creating, by the services provider, a managed version of the third container base image.

3. The computer implemented method according to claim 2, wherein the managed version of the third container base image comprises the third container base image appended to include an injection point.

4. The computer implemented method according to claim 1, further comprising:
determining, by the services provider, a set of managed images related to the first vulnerability;
patching, by the services provider, each managed image of the set of managed images using the created first patch script for addressing the first vulnerability; and
publishing, by the services provider, each patched managed image of the set of managed images.

5. The computer implemented method according to claim 1, further comprising the service provider enabling a user to reject pulling the first or second patched managed container based image.

6. The computer implemented method according to claim 1, further comprising:
determining, by the services provider, that a fourth container base image is not managed;
creating, by the services provider, a managed version of the fourth container base image, wherein the managed version of the fourth container base image comprises an injection point; and enabling, by the services provider, a user to reject pulling the managed version of the fourth container based image.

7. A computer program product for managing application execution, the computer program product comprising one or more computer readable storage devices and stored program instructions on the one or more computer readable storage devices, the stored program instructions executed on one or more computer processors comprising:
program instructions for providing a registry of managed container base images, each managed container base image of the managed container base images comprising an original container base image;
program instructions for identifying image layers in a layer chain for each original container base image in the managed container based images;
program instructions for identifying a root layer operating system in the identified image layers for each original container base image in the managed container based images;
program instructions for appending an injection point to each original container base image in the managed container based images according to coding of the root layer operating system;
program instructions for determining that a first managed container base image from the registry of managed container base images includes a first vulnerability;
program instructions for creating a first patch script to address the first vulnerability;
program instructions for inserting the first patch script at the injection point of the determined first managed container base image to create a patched first managed container based image;
program instructions for determining, by the one or more computer processors, that a second managed container base image from the registry of managed container base images includes a second vulnerability;
program instructions for creating, by the one or more computer processors, a second patch script to address the second vulnerability;
program instructions for inserting, by the one or more computer processors, the second patch script at the injection point of the second managed container base image, resulting in a patched second managed container base image;
program instructions for issuing a restart command for an application using the determined first managed container base image, to a container orchestration tool to pull the patched first managed container based image and rebuild the determined first managed container base image by executing the first patch script; and
program instructions for publishing, by the services provider, the patched second managed container base image.

8. The computer program product according to claim 7, the stored program instructions further comprising:
program instructions for receiving a request for a third container base image;
program instructions for determining that the third container base image is not managed; and
program instructions for creating a managed version of the third container base image.

9. The computer program product according to claim 8, wherein the managed version of the third container base image comprises the third container base image appended to include an injection point.

10. The computer program product according to claim 7, the stored program instructions further comprising:
 program instructions for determining a set of managed images related to the first vulnerability;
 program instructions for patching each managed image of the set of managed images using the created first patch script for addressing the first vulnerability; and
 program instructions for publishing each patched managed image of the set of managed images.

11. The computer program product according to claim 7, the stored program instructions further comprising program instructions for enabling a user to reject pulling the first or second patched managed container based image.

12. The computer program product according to claim 7, the stored program instructions further comprising:
 program instructions for determining that a fourth container base image is not managed;
 program instructions for creating a managed version of the fourth container base image, wherein the managed version of the fourth container base image comprises an injection point; and
 program instructions enabling a user to reject pulling the managed version of the fourth container based image.

13. A computer system for managing application execution, the computer system comprising:
 one or more computer processors;
 one or more computer readable storage devices; program instructions for providing a registry of managed container base images, each managed container base image of the managed container base images comprising an original container base image;
  program instructions for identifying image layers in a layer chain for each original container base image in the managed container based images;
  program instructions for identifying a root layer operating system in the identified image layers for each original container base image in the managed container based images;
  program instructions for appending an injection point to each original container base image in the managed container based images according to coding of the root layer operating system;
  program instructions for determining that a first managed container base image from the registry of managed container base images includes a first vulnerability;
  program instructions for creating a first patch script to address the first vulnerability;
  program instructions for inserting the first patch script at the injection point of the determined first managed container base image to create a patched first managed container based image;
  program instructions for determining, by the one or more computer processors, that a second managed container base image from the registry of managed container base images includes a second vulnerability;
  program instructions for creating, by the one or more computer processors, a second patch script to address the second vulnerability;
  program instructions for inserting, by the one or more computer processors, the second patch script at the injection point of the second managed container base image, resulting in a patched second managed container base image;
  program instructions for issuing a restart command for an application using the determined first managed container base image, to a container orchestration tool to pull the patched first managed container based image and rebuild the determined first managed container base image by executing the first patch script; and
  program instructions for publishing, by the one or more computer processors, the patched second managed container base image.

14. The computer system according to claim 13, the stored program instructions further comprising:
 program instructions for receiving a request for a third container base image;
 program instructions for determining that the third container base image is not managed; and
 program instructions for creating a managed version of the third container base image.

15. The computer system according to claim 14, wherein the managed version of the third container base image comprises the third container base image appended to include an injection point.

16. The computer system according to claim 13, the stored program instructions further comprising:
 program instructions for determining a set of managed images related to the first vulnerability;
 program instructions for patching each managed image of the set of managed images using the created first patch script for addressing the first vulnerability; and
 program instructions for publishing each patched managed image of the set of managed images.

17. The computer system according to claim 13, the stored program instructions further comprising:
 program instructions for receiving a request for a fourth container base image;
 program instructions for determining that the fourth container base image is not managed;
 program instructions for creating a managed version of the fourth container base image, wherein the managed version of the fourth container base image comprises an injection point; and
 program instructions for enabling a user to reject pulling the managed version of the fourth container based image.

* * * * *